United States Patent
Lin

(10) Patent No.: US 8,952,210 B2
(45) Date of Patent: Feb. 10, 2015

(54) SOLIDS REMOVAL FROM BIO-OIL USING BIOMASS FILTER AID

(75) Inventor: Ronny W. Lin, Sugar Land, TX (US)

(73) Assignee: KiOR, Inc., Pasadena, TX (US)

( * ) Notice: Subject to any disclaimer, the term of this patent is extended or adjusted under 35 U.S.C. 154(b) by 1108 days.

(21) Appl. No.: 12/835,499

(22) Filed: Jul. 13, 2010

(65) Prior Publication Data

US 2012/0012451 A1 Jan. 19, 2012

(51) Int. Cl.
*C10B 49/02* (2006.01)
*C10B 53/02* (2006.01)
*B01D 37/02* (2006.01)
*B01D 29/76* (2006.01)

(52) U.S. Cl.
USPC ........... 585/240; 210/769; 210/777; 210/778; 44/605; 44/606; 201/4; 201/28

(58) Field of Classification Search
None
See application file for complete search history.

(56) References Cited

U.S. PATENT DOCUMENTS

| | | | |
|---|---|---|---|
| 2,768,754 | A | 10/1956 | Briggs |
| 3,538,020 | A | 11/1970 | Heskett et al. |
| 4,147,593 | A | 4/1979 | Frischmuth et al. |
| 4,942,269 | A | 7/1990 | Chum et al. |
| 4,959,154 | A | 9/1990 | Simmons |
| 5,320,655 | A | 6/1994 | Ernst |
| 5,792,340 | A | 8/1998 | Freel et al. |
| 6,344,239 | B1 | 2/2002 | Asai et al. |
| 6,814,940 | B1 | 11/2004 | Hiltunen et al. |
| 6,830,597 | B1 | 12/2004 | Green |
| 7,004,999 | B2 | 2/2006 | Johnson et al. |
| 2007/0007188 | A1 | 1/2007 | Skrypski-Mantele et al. |
| 2008/0250927 | A1 | 10/2008 | Rogers et al. |
| 2008/0286557 | A1 | 11/2008 | Tucker |
| 2009/0139851 | A1 | 6/2009 | Freel |
| 2010/0058652 | A1* | 3/2010 | Farwick et al. ................. 44/388 |
| 2010/0105970 | A1 | 4/2010 | Yanik et al. |
| 2011/0143012 | A1 | 6/2011 | Rettenmaier |

OTHER PUBLICATIONS

Definition pages and schedule page For Class 210; Subclass 778; 3 pages.*
"Oil" as downloaded from Wikipedia on Jun. 28, 2014; 5 pages.*
International Search Report and Written Opinion for co-pending PCT Application No. PCT/US2011/042580, filed Jun. 30, 2011; Dated Nov. 8, 2011; 9 pages.
Dr. Eberhard Gerdes et al; Alternatives from Wood and Cellulose, Precoat Filtration with Organic Filter Aids; JRS Filtration & Separation; Dec. 1997; 6 pages; vol. 34, No. 10, ISSN 0015-1882;.
Maximize Biodiesel Yields by Using Celite Filter Aids, Filtration, Dewatering, Dewaxing, and Winterization; World Minerals Americas and World Headquarters; 2009; 4 pages; Santa Barbara, California.

* cited by examiner

*Primary Examiner* — Robert James Popovics
(74) *Attorney, Agent, or Firm* — Hovey Williams LLP

(57) ABSTRACT

A green process and system are disclosed for utilizing a biomass filter aid in the filtration of a bio-oil. The process comprises filtering a bio-oil containing residual solids from a conversion reaction in the presence of the biomass filter aid to produce a filtered bio-oil. The biomass filter aid facilitates efficient removal of residual solids from the bio-oil. The spent biomass filter aid containing the residual solids may be recycled as a conversion feedstock or used as a combustion heat source in the biomass conversion system.

17 Claims, 4 Drawing Sheets

SOLIDS REMOVAL FROM BIO-OIL USING BIOMASS FILTER AID

BACKGROUND

1. Field of the Invention

The present invention relates generally to the treatment of bio-oil. More specifically, the invention concerns processes and apparatuses for removing undesirable solid components from bio-oil.

2. Description of the Related Art

With its low cost and wide availability, biomass has increasingly been emphasized as an ideal feedstock in alternative fuel research. Consequently, many different conversion processes have been developed that use biomass as a feedstock to produce useful biofuels and/or specialty chemicals. Existing biomass conversion processes include, for example, combustion, gasification, slow pyrolysis, fast pyrolysis, liquefaction, and enzymatic conversion.

Many of the existing biomass conversion processes produce bio-oils containing small residual solid particles. Such bio-oils may require filtration in order to remove these residual solid particles. Since the residual solids often contain fine particles of less than 30 microns in size, fine-scale filters are required. Most filters capable of removing residual solids from bio-oil are rapidly clogged by gelatinous-type solids found in bio-oil. This rapid clogging can cause residual solids filtration methods to be expensive and challenging to scale up.

Accordingly, there is a need for an improved and "green" process and system for removing residual solids from bio-oil.

SUMMARY OF THE INVENTION

In one embodiment, the present invention is directed to a bio-oil treatment process comprising the steps of (a) coating a porous filter element with particles of a biomass filter aid to thereby provide a coated filter element and (b) passing an initial bio-oil having a liquid phase and residual solids through the coated filter element. During step (b), a substantial portion of the residual solids are retained by the coated filter element, while substantially all of the liquid phase passes through the coated filter element to provide a filtered bio-oil.

In another embodiment, the present invention is directed to a bio-oil treatment process comprising the steps of (a) combining particles of a biomass filter aid with an initial bio-oil having a liquid phase and residual solids to thereby provide a pre-filter mixture and (b) passing the pre-filter mixture through a filter element so that a substantial portion of the residual solids and biomass filter aid are retained by the filter element, while substantially all of the liquid phase passes through the filter element to provide a filtered bio-oil.

In a further embodiment, the present invention is directed to a biomass conversion system comprising a biomass feedstock source for providing solid particulate biomass, a splitter coupled to the biomass feedstock source that is operable to split the solid particulate biomass into a biomass feedstock fraction and a biomass filter aid fraction, a conversion reactor for thermally converting the biomass feedstock fraction into an initial conversion product, a residual solids separator for removing residual solids from at least a portion of the initial conversion product, a biomass feed system for transporting the biomass feedstock fraction from the splitter to the conversion reactor, and a biomass filter aid transport mechanism for transporting the biomass filter aid from the splitter to the residual solids separator.

Using biomass as a green filter aid makes it feasible to recycle the spent biomass filter aid for bio-oil production and/or as a combustion heat resource instead of waste disposal as with a conventional filter aid.

BRIEF DESCRIPTION OF THE FIGURES

Embodiments of the present invention are described herein with reference to the following drawing figures, wherein.

DETAILED DESCRIPTION

Figure 1:
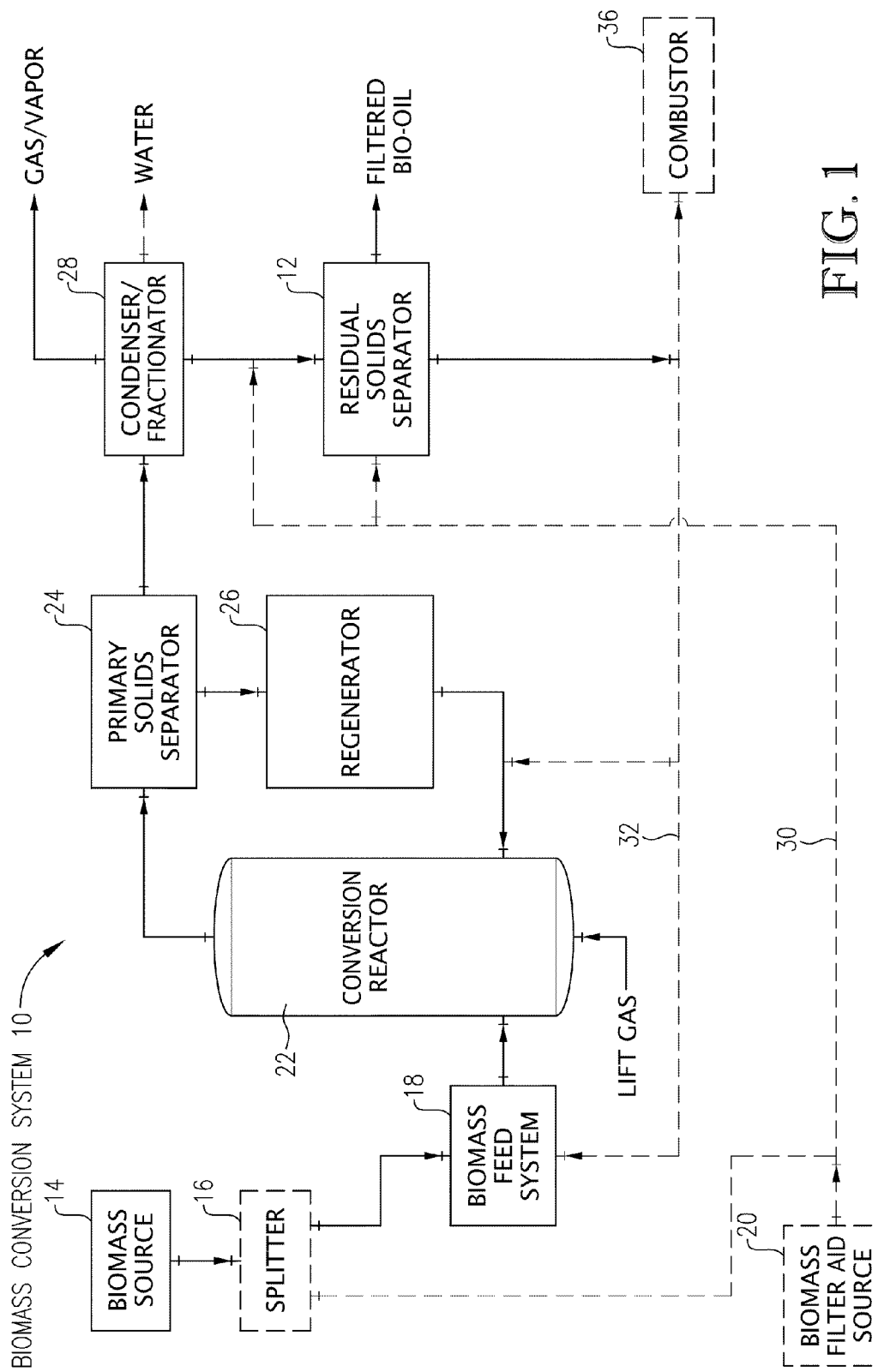
FIG. 1 is a schematic diagram of a biomass conversion system according to one embodiment of the present invention.

FIG. 1 depicts a biomass conversion system 10 that employs a residual solids separator 12 to remove residual solids from bio-oil. It should be understood that the biomass conversion system shown in FIG. 1 is just one example of a system within which the present invention can be embodied. The present invention may find application in a wide variety of other systems where it is desirable to efficiently and effectively remove residual solids from bio-oil. The exemplary biomass conversion system illustrated in FIG. 1 will now be described in detail.

The biomass conversion system 10 of FIG. 1 includes a biomass source 14 for supplying a biomass feedstock to be converted to bio-oil. The biomass source 14 can be, for example, a hopper, storage bin, railcar, over-the-road trailer, or any other device that may hold or store biomass. The biomass supplied by the biomass source 14 is preferably in the form of solid particles having a mean particle size of 0.01 to 1,000 microns, 1 to 750 microns, or 50 to 500 microns. The biomass particles can be fibrous biomass materials comprising cellulose. Examples of suitable cellulose-containing materials include algae, paper waste, and/or cotton linters. In one embodiment, the biomass particles can comprise a lignocellulosic material. Examples of suitable lignocellulosic materials include forestry waste, such as wood chips, saw dust, pulping waste, and tree branches; agricultural waste such as corn stover, wheat straw, and bagasse; and/or energy crops such as eucalyptus, switch grass, and coppice.

As depicted in FIG. 1, the solid biomass particles from the biomass source 14 can optionally be fed to a splitter 16 that splits the biomass into a feedstock fraction and a filter aid fraction. The biomass filter aid fraction can then be supplied directly or indirectly to the residual solids separator 12, while the feedstock fraction can be supplied to a biomass feed system 18. The splitter 16 can be any conventional device capable of dividing solid particulates into separate fractions. When the splitter 16 is employed, the biomass used as a filter aid in the residual solids separator 12 has the same composition as the biomass provided to the biomass feed system 18.

When the splitter 16 is not employed, the biomass filter aid supplied to the residual solids separator can be provided by a separate biomass filter aid source 20. When all or part of the biomass filter aid is supplied by the separate biomass filter aid source 20, the composition of the biomass filter aid employed in the residual solids separator 12 can be different than the composition of the biomass that is supplied to the biomass feed system 18.

As used herein, "biomass filter aid" means a biomass-containing medium that promotes the efficiency or effectiveness of a filtration process for removing solids from a fluid. The biomass filter aid described herein can be formed of at least 50 weight percent biomass, at least 75 weight percent biomass, or at least 90 weight percent biomass. As alluded to above, in one embodiment, the biomass filter aid can have the same composition, properties, and particle size as the biomass converted to bio-oil.

Referring again to FIG. 1, the biomass feed system 18 can be any system capable of feeding solid particulate biomass to a biomass conversion reactor 22. As described in further detail below, in one embodiment, the biomass feed system 18 combines the fresh biomass received from the biomass source 14 with spent biomass filter aid recovered from the residual solids separator 12. Also, it may be desirable to combine the biomass with a catalyst in the biomass feed system 18 in order to promote conversion of the biomass to the desired bio-oil product. Suitable catalytic materials that can be combined with the biomass prior to introduction into the conversion reactor 22 include, for example, zeolites, hydrotalcites, hydrotalcite-like materials, clays, and/or refractory oxides such as alumina.

In one embodiment of the present invention, the biomass feed to the conversion reactor is unprocessed. As used herein, "unprocessed biomass" means biomass that has not been subjected to any pretreatments that significantly change the chemical make-up of the biomass. An example of a pretreatment that would significantly change the chemical make-up of biomass would be delignification. Thus, unprocessed biomass excludes cellulose fibers extracted from lignocellulose. Examples of pretreatment methods that do not significantly change the chemical make-up of biomass include particulating, grinding, agitating, drying, and mixing with a catalyst.

In the conversion reactor 22, biomass is subjected to a conversion reaction that produces bio-oil. The conversion reactor 22 can facilitate different chemical conversion reactions such as fast pyrolysis, slow pyrolysis, liquefaction, gasification, or enzymatic conversion. The conversion reactor 22 can be, for example, a fluidized bed reactor, cyclone reactor, ablative reactor, or a riser reactor.

In one embodiment, the conversion reactor 22 can be a riser reactor and the conversion reaction is fast pyrolysis. Fast pyrolysis is characterized by short residence times and rapid heating of the biomass feedstock. The residence times of the fast pyrolysis reaction can be, for example, less than 10 seconds, less than 5 seconds, or less than 2 seconds. Fast pyrolysis may occur at temperatures between 200 and 1,000° C., between 250 and 800° C., or between 300 and 600° C.

The product exiting the conversion reactor 22 generally comprises gas, vapors, and solids. In the case of fast pyrolysis, the solids in the product exiting the conversion reaction generally comprise particles of char, ash, and/or catalyst. As depicted in FIG. 1, the product from the conversion reactor 22 can be introduced into a primary solids separator 24. The primary solids separator 24 can be any conventional device capable of separating solids from gas/vapors such as, for example, a cyclone separator or a gas filter. The primary solids separator 24 removes relatively larger solids (e.g., greater than 20 microns) from the reaction product, but small residual solids remain entrained in the gas/vapor phase. The relatively large particles recovered in the primary solids separator 24, which can include any spent catalysts and char, are introduced into a regenerator 26 for regeneration, typically by combustion.

The remaining gas/vapor phase conversion products from the primary solids separator 24 are introduced into a condenser 28. The condenser 28 condenses at least a portion of the remaining conversion products into bio-oil, while the residual gas and uncondensed vapor are drawn off in a separate stream. The bio-oil recovered from the condenser 28 comprises a liquid phase and residual solids. The amount of residual solids in the bio-oil is generally about 0.05 to 5 weight percent, and the residual solids can have a mean particle size of about 0.1 to 200 microns or 1 to 100 microns. The condenser 28 may also function as a fractionator that separates and removes residual water from the conversion products and/or bio-oil.

After exiting the condenser 28, the bio-oil is introduced into a residual solids separator 12 for removal of the residual solids present in the bio-oil. The types of residual solids separators 12 that may be used can include, for example, centrifugal separators, gravitational separators, and/or pressure separators. Specific examples of the residual solids separator 12 include a horizontal plate filter, a centrifuge, a rotary filter, and a bag filter. Exemplary types of residual solid separators are depicted in FIGS. 2-5 and are described in more detail in a later section of this document.

Referring again to FIG. 1, the residual solids separator 12 comprises a porous filter element through which the bio-oil flows in order to remove the residual particles from the bio-oil. Any sufficiently-fine conventional filter known in the art may be used as the filter element. The filter element has an inlet side and outlet side relative to the residual solids separator 12. The inlet side is capable of being supplied with and supporting a biomass filter aid.

In one embodiment of the present invention, the filter element of the residual solids separator 12 is pre-coated with a biomass filter aid prior to passing the bio-oil through the filter element. Such pre-coating can be carried out by any method known in the art such as, for example, spraying the biomass filter aid onto the inlet side of the filter element.

In another embodiment of the present invention, the biomass filter aid is combined with the bio-oil upstream of the residual solids separator 12 to create a pre-filter mixture. The pre-filter mixture is then passed through the filter element (optionally pre-coated with biomass filter aid), where both the biomass filter aid and the residual solids are retained by the filter element.

As shown in FIG. 1, the biomass filter aid can be supplied to the residual solids separator 12 by a biomass filter aid transport mechanism 30. The biomass filter aid transport mechanism can be any conventional device for transporting solids such as, for example, a pneumatic conveyor or simply a wheeled vehicle capable of carrying a container of the biomass filter aid. When pre-coating of the filter element is employed, the biomass filter aid transport mechanism 30 supplies the biomass filter aid directly to the residual solid separator 12. When pre-mixing of the biomass filter aid and bio-oil is employed, the biomass filter aid transport mechanism 30 supplies the biomass filter aid to a mixing location upstream of the residual solids separator 12.

When the bio-oil (optionally pre-mixed with the biomass filter aid) is passed through the filter element (optionally pre-coated with the biomass filter aid), at least 50 weight percent, 75 weight percent, or 90 weight percent of the residual solids present in the bio-oil is retained by the filter element, while substantially all of the liquid phase of the bio-oil passes through the filter element. The resulting filtered bio-oil can then be used directly or further processed into a variety of end products.

After filtering the bio-oil, the spent solids on the filter element (i.e., spent biomass filter aid and the residual solids retained thereon, therein, and/or therewith) can be removed from the residual solids separator 12. In one embodiment, the spent solids removed from the residual solids separator 12 can be routed by a spent solids transport mechanism 32 to the conversion reactor 22 for use as a conversion feedstock. In another embodiment, the spent solids can be routed to a combustor 36 to provide heat that can be used in the biomass conversion system 10.

FIGS. 2-5 illustrate examples of residual solids separators suitable for use in conjunction with the present invention. It should be understood that these examples are included merely for the purposes of illustration and are not intended to limit the scope of the invention unless otherwise specifically indicated.

Figure 2:
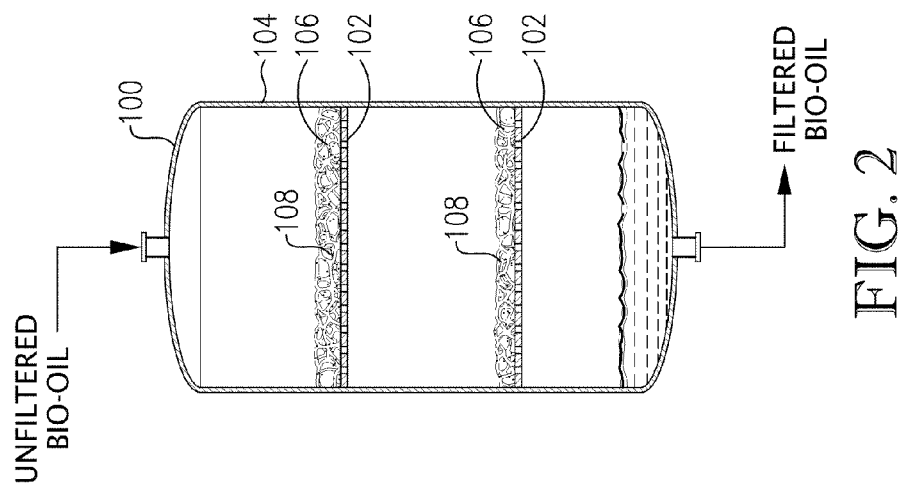
FIG. 2 depicts a horizontal plate filter suitable for use in conjunction with the present invention.

In one embodiment of the invention, the biomass filter aid may be used in a horizontal plate filter 100, as depicted in FIG. 2. In this embodiment, a plurality of plate-type filter elements 102 are contained within a filter housing 104. An unfiltered bio-oil (optionally pre-mixed with a biomass filter aid 106) is introduced at the top of the horizontal plate filter 100 and passes by gravitational force through the filter elements 102 (optionally pre-coated with a biomass filter aid 106). Upon passing the bio-oil through the filter elements 102, the residual solids 108 are retained on the filter element 102, along with the biomass filter aid 106. The resulting filtered bio-oil exits the bottom of the plate filter 100.

Figure 3:
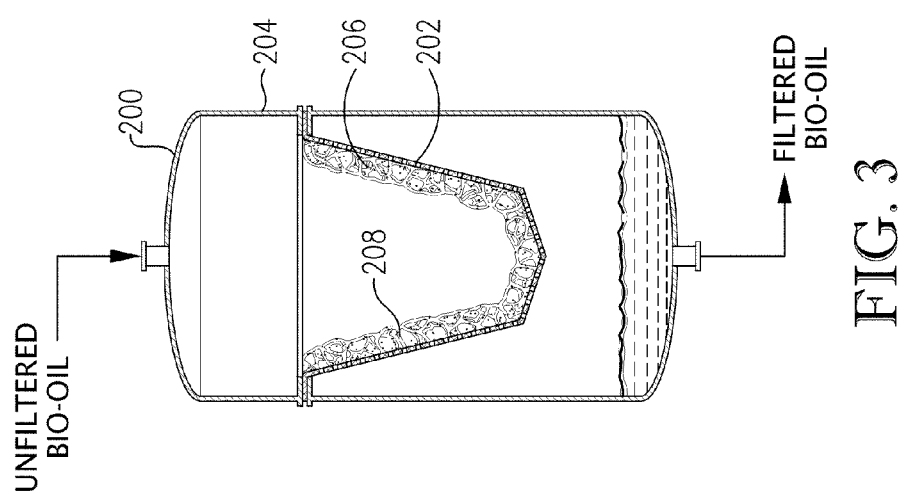
FIG. 3 depicts a bag filter suitable for use in conjunction with the present invention.

In another embodiment of the invention, the biomass filter aid may be used in a bag filter 200 as depicted in FIG. 3. In this embodiment, a bag-type filter element 202 is contained within a filter housing 204. An unfiltered bio-oil (optionally pre-mixed with a biomass filter aid 206) is introduced at the top of the bag filter 200 and passes by gravitational force through the filter element 202 (optionally pre-coated with a biomass filter aid 206). Upon passing the bio-oil through the filter element 202, the residual solids 208 are retained on the filter element 202, along with the biomass filter aid 206. The resulting filtered bio-oil exits the bottom of the bag filter 200.

Figure 4:
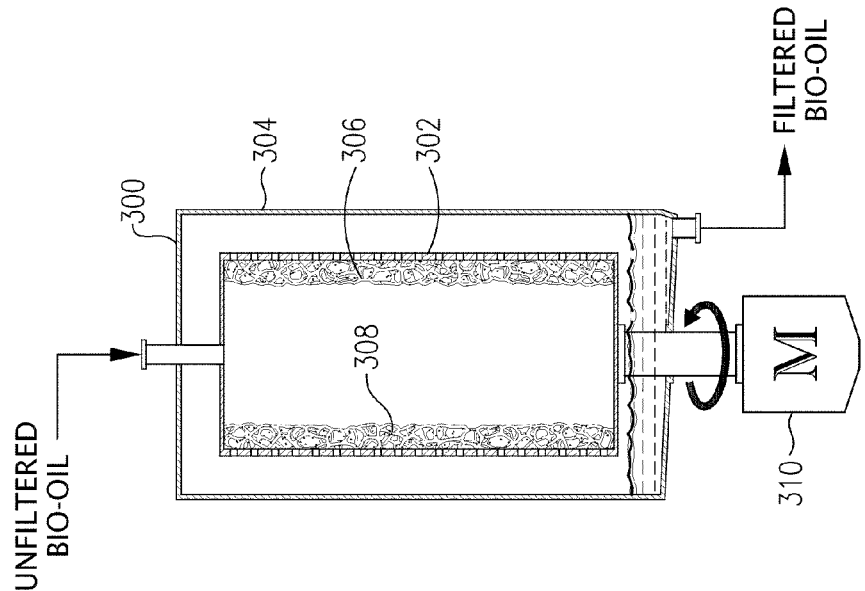
FIG. 4 depicts a centrifuge suitable for use in conjunction with the present invention.

In a further embodiment of the invention, the biomass filter aid may be used in a centrifuge separator 300 as depicted in FIG. 4. In this embodiment, a rapidly-rotating filter element 302 is contained within a filter housing 304. The filter element 302 (optionally pre-coated with a biomass filter aid 306) surrounds an inner cavity where an unfiltered bio-oil (optionally pre-mixed with a biomass filter aid 306) is introduced. The liquid phase of the bio-oil passes by centrifugal force through the filter element 302, while the residual solids 308 and biomass filter aid 306 are retained on the filter element 302. The centrifuge separator 300 includes a motor 310 for rotating the filter element 302, thereby providing the centrifugal force required for separation. The resulting filtered bio-oil exits the bottom of the centrifuge 300.

Figure 5:
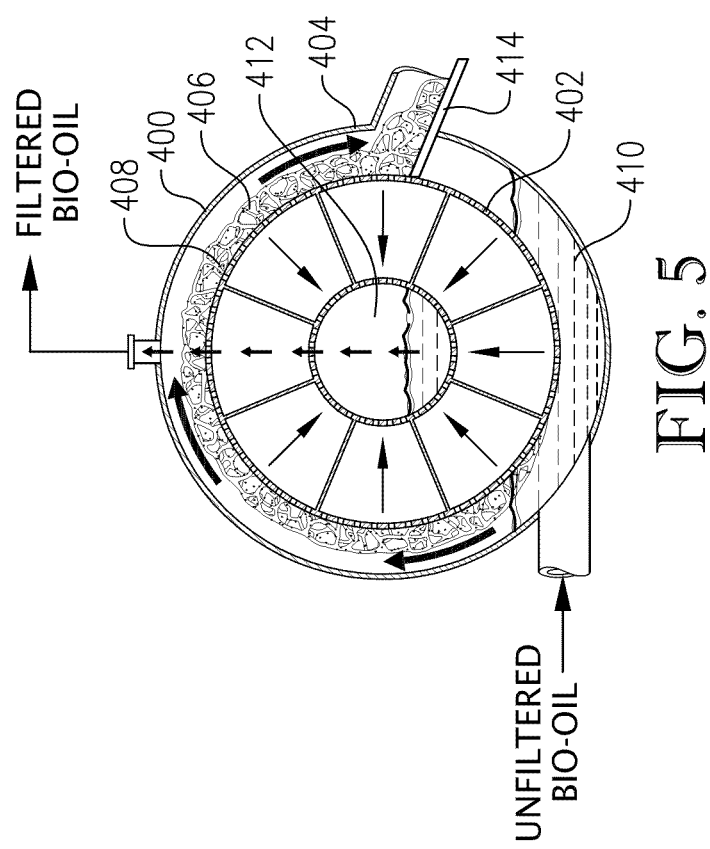
FIG. 5 depicts a rotary filter suitable for use in conjunction with the present invention.

In yet another embodiment of the invention, the biomass filter aid may be used in a rotary filter 400 as depicted in FIG. 5. In this embodiment, a cylindrical filter element 402 forming the outside surface of rotating drum is contained within a filter housing 404. An unfiltered bio-oil (optionally pre-mixed with a biomass filter aid 406) is introduced into the rotary filter 400. Upon passing the bio-oil through the filter element 402 (optionally pre-coated with a biomass filter aid 406) the residual solids 408 and biomass filter aid 406 are retained on the filter element 402. The unfiltered bio-oil may be drawn through the filter element 402 by pressurizing the outer chamber 410 and creating a pressure differential across the filter element. Alternatively, a vacuum may be created in the inner chamber 412, which draws the unfiltered bio-oil through the filter element 402. The spent biomass filter aid 406 and residual solids retained 408 thereon may be removed from the filter element 402 by a knife 414 present in the outer chamber 410. The filtered bio-oil exits the rotary filter after passing through the inner chamber 412.

EXAMPLE

Figure 7:
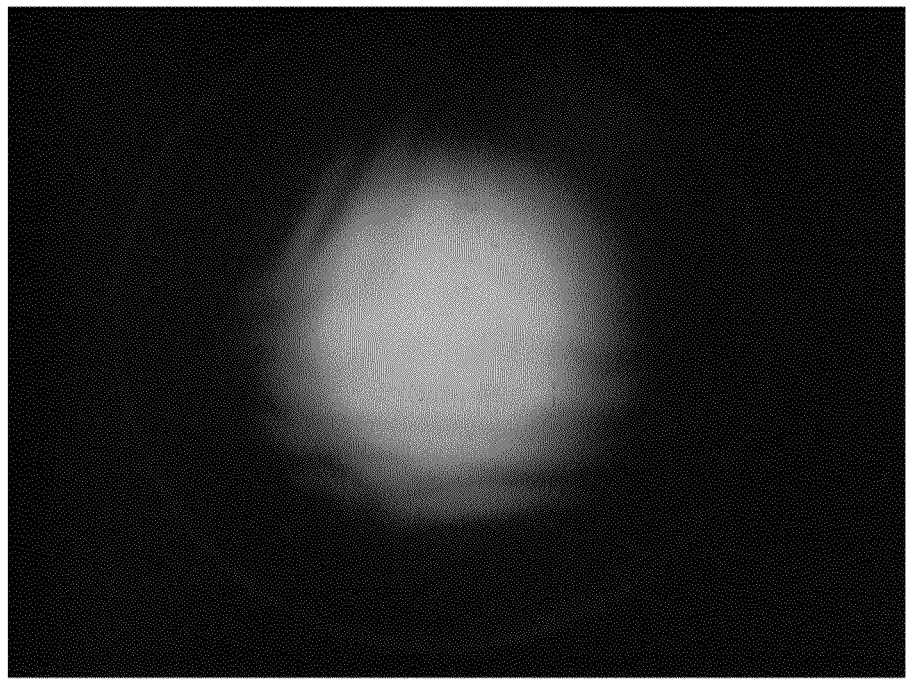
FIG. 7 is a picture of a filtered bio-oil under 100× magnification.
Figure 6:
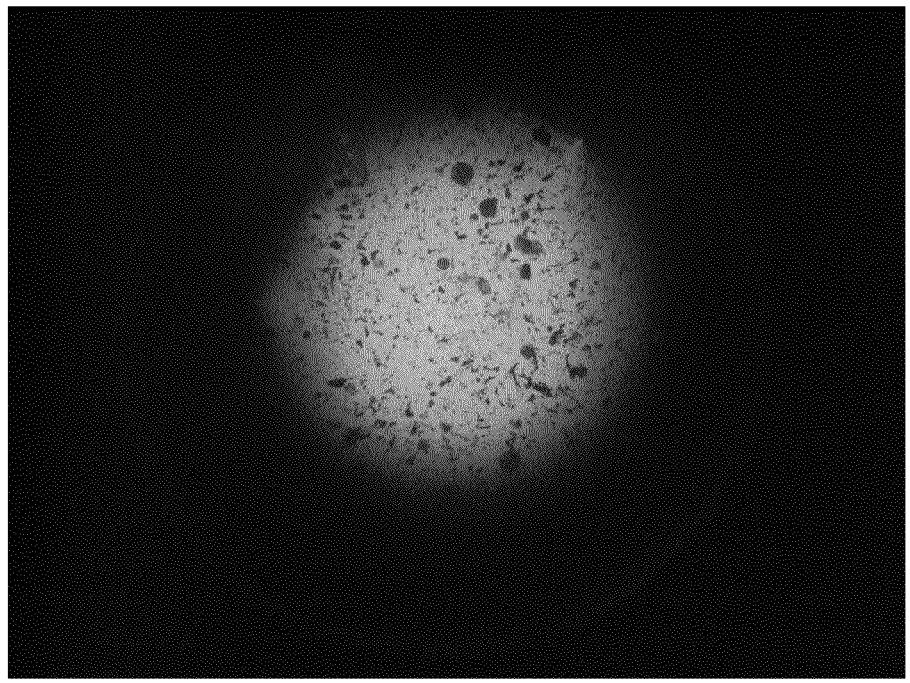
FIG. 6 is a picture of an unfiltered bio-oil under 100× magnification.

Biomass (2 g; 32.3 weight percent of biomass particles ranging in sizes from 0-150 micron and 67.7 weight percent of biomass particles with sizes greater than 150 micron) was evenly applied onto circular filter paper with a 7 cm diameter. A fresh bio-oil sample (47 g) was filtered through the coated filter medium under vacuum conditions to obtain a filtered bio-oil (41 g). Pictures of the fresh/unfiltered bio-oil (FIG. 6) and the filtered bio-oil (FIG. 7) were taken under a 100× microscope. As shown in FIGS. 6 and 7, the filtered bio-oil was visually particle free and significantly clearer than the fresh/unfiltered bio-oil.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

What is claimed is:

1. A bio-oil filtration process comprising:
   (a) pyrolyzing a solid biomass feedstock to form an initial bio-oil comprising a liquid phase and residual solids;
   (b) coating at least a portion of a porous filter element with particles of a biomass filter aid to thereby provide a coated filter element;
   (c) passing said initial bio-oil through said coated filter element, wherein a substantial portion of said residual solids are retained by said coated filter element, wherein substantially all of said liquid phase passes through said coated filter element to thereby provide a filtered bio-oil; and
   (d) removing said biomass filter aid and the retained solids from said filter element and using at least a portion of the removed biomass filter aid as a feedstock in a pyrolysis process.

2. The process of claim 1, wherein said biomass filter aid comprises wood particles.

3. The process of claim 1, wherein said solid biomass feedstock has substantially the same composition as said biomass filter aid.

4. The process of claim 1, wherein the mean particle size of said biomass filter aid is in the range of about 0.01 to about 1,000 microns, wherein the mean particle size of said residual solids is in the range of about 0.1 to about 200 microns.

5. The process of claim 1, wherein said residual solids comprise catalyst fines, ash, and/or char.

6. The process of claim 1, wherein the amount of said residual solids present in said initial bio-oil is in the range of about 0.05 to about 5 weight percent, wherein at least 50 weight percent of said residual solids present in said initial bio-oil are retained by said coated filter element when said initial bio-oil is passed therethrough.

7. The process of claim 1, wherein said coating of step (b) comprises spraying a layer of said biomass filter aid particles onto said filter element or passing a slurry comprising said biomass filter aid particles through said filter element.

8. The process of claim 1, further comprising combining at least a portion of said biomass filter aid with at least a portion of said initial bio-oil upstream of said filter element, wherein said coating of step (b) includes passing the resulting bio-oil/filter aid mixture through said filter element.

9. The process of claim 1, wherein said filter element is disposed in a centrifugal separator, a gravitational separator, or a pressure separator.

10. The process of claim 1, wherein at least a portion of the removed biomass filter aid is converted into bio-oil in said pyrolysis process.

11. A bio-oil filtration process comprising:
  (a) pyrolyzing a solid biomass feedstock to form an initial bio-oil comprising a liquid phase and residual solids;
  (b) combining particles of a biomass filter aid with said initial bio-oil to thereby provide a pre-filter mixture; and
  (c) passing said pre-filter mixture through a filter element, wherein a substantial portion of said residual solids and biomass filter aid are retained by said filter element, wherein substantially all of said liquid phase passes through said filter element to thereby provide a filtered bio-oil; and
  (d) removing said biomass filter aid and the retained solids from said filter element and using at least a portion of the removed biomass filter aid as a feedstock in a pyrolysis process.

12. The process of claim 11, further comprising, prior to said passing of step (c), precoating said filter element with a precoating filter aid comprising biomass particles.

13. The process of claim 11, further comprising separating an initial quantity of biomass particles into a biomass feedstock fraction and a biomass filter aid fraction, wherein said biomass feedstock fraction is used as said solid biomass feedstock in step (a), wherein said biomass filter aid fraction is employed as said biomass filter aid of step (b).

14. The process of claim 11, further comprising, prior to said passing of step (c), removing from said initial bio-oil solid particles larger than said residual solids.

15. The process of claim 11, wherein the mean particle size of said biomass filter aid is in the range of about 0.01 to about 1,000 microns, wherein the mean particle size of said residual solids is in the range of about 0.1 to about 200 microns.

16. The process of claim 11, wherein said residual solids comprise catalyst fines, ash, and/or char.

17. The process of claim 11, wherein the amount of said residual solids present in said initial bio-oil is in the range of about 0.05 to about 5 weight percent, wherein at least 50 weight percent of the residual solids present in said initial bio-oil is retained on, in, and/or with said biomass filter aid.

\* \* \* \* \*